United States Patent
Jasper et al.

(10) Patent No.: US 6,441,786 B1
(45) Date of Patent: Aug. 27, 2002

(54) ADAPTIVE ANTENNA ARRAY AND METHOD FOR CONTROL THEREOF

(75) Inventors: Steven C. Jasper, Hoffman Estates; Mark Allen Birchler, Roselle; Nicholas C. Oros, Schaumburg; James P. Michels, Elk Grove Village, all of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/909,602

(22) Filed: Jul. 20, 2001

(51) Int. Cl.[7] .............................. G01S 3/16; G01S 3/28
(52) U.S. Cl. ....................................... 342/383; 342/380
(58) Field of Search ................................. 342/383, 380

(56) References Cited

U.S. PATENT DOCUMENTS 5,982,327 A * 11/1999 Vook et al. ................. 342/380
6,141,393 A * 10/2000 Thomas et al. ............. 375/347

* cited by examiner

Primary Examiner—Theodore M. Blum
(74) Attorney, Agent, or Firm—Jeffrey K. Jacobs

(57) ABSTRACT

A method for controlling an adaptive antenna array (50) is provided and includes receiving a plurality of signals, each signal including a series of signal data symbols (42) and signal non-data symbols (38, 40) divided into symbol transmission units with the signal non-data symbols (38, 40) disposed among the signal data symbols (42) in each unit and each signal related to the other signals of the plurality of signals as reflections of an original signal. The method also includes separating the signal non-data symbols (38, 40) from the signal data symbols (42), and comparing the signal non-data symbols (38, 40) to a set of known non-data symbols. The method further includes determining a set of weights according to the comparison of the signal non-data symbols (38, 40) to the set of known non-data symbols, the weights to be combined with the signal data values (42) to limit the effect of interference on the signal data symbols (42). An adaptive antenna array (50) is also provided including a weight calculator (62) including a program which controls the weight calculator (62) to perform the comparing (88, 90) and determining steps (94) of the method discussed above.

19 Claims, 5 Drawing Sheets

ADAPTIVE ANTENNA ARRAY AND METHOD FOR CONTROL THEREOF

FIELD OF THE INVENTION

The present invention relates to adaptive antenna arrays and methods for controlling adaptive antenna arrays, and, in particular, to adaptive antenna arrays using non-data (e.g., pilot) symbol-assisted channel estimation and methods for controlling such arrays.

BACKGROUND OF THE INVENTION

Given the proliferation of wireless communications devices in recent years, the wireless communications industry is now facing a significant and complex problem in terms of signal interference. Each mobile station, such as a cellular telephone, represents a potential source of interference for other mobile stations. Moreover, given recent trends in telecommunication use, the number of cellular telephones and other wireless communications devices will probably only increase over the next several years.

To limit the effects of the interference caused by the proliferation of wireless devices, an adaptive antenna array, also referred to as a smart antenna, having interference rejecting or nulling capabilities may be used. For example, the adaptive antenna array may perform a process referred to as diversity combining to compensate for interference as well as for signal fading.

After a mobile station transmits a radio frequency communication signal, the original signal encounters a variety of physical surfaces that cause the signal to be reflected. Because of these reflective surfaces, referred to as reflectors or scatterers, the original signal becomes a plurality of reflected signals. Each of these reflected signals arrives separately at the receiving device (for example, a base site having an adaptive antenna array including a plurality of antenna elements) after traveling along one of a multiplicity of paths. At each antenna element, the reflected signals combine together to form a composite signal.

The resultant propagation, or fading, characteristics of the composite signal differ from antenna element to antenna element due to spatial separation and/or the use of different polarizations. In diversity combining, the received signals are processed separately, weighted (e.g. multiplied by a weight) and then combined. The weights are calculated to compensate for interference and signal fading.

The weights may be calculated according to a variety of algorithms. Two such combining algorithms, the Least-Mean-Square ("LMS") algorithm and the Direct Matrix Inversion ("DMI") algorithm, are described by J. H. Winters, *Signal Acquisition and Tracking with Adaptive Arrays in the Digital Mobile Radio System IS-54 with Flat Fading*, IEEE Transactions on Vehicular Technology (November 1993). The LMS and DMI algorithms are designed to minimize the mean-square error between a reference signal and the processed, weighted, and combined output of the adaptive antenna array.

These algorithms are not without their disadvantages. As Winters points out, the LMS algorithm is not well suited for handling a signal interference phenomenon known as multipath fading, wherein the various signals received at the elements of the adaptive antenna array are out of phase with one another. Winters also admits that the DMI algorithm is also not well suited for use with time-varying signals, and recommends incorporating periodic "training" or recalibration with such techniques as sliding windows or forgetting functions to compensate for the time varying nature of the signal with which the DMI algorithm is used.

DESCRIPTION OF THE PREFERRED EMBODIMENT

According to an aspect of the present invention, a method for controlling an adaptive antenna array includes receiving a plurality of signals, each signal including a series of signal data symbols and signal non-data symbols with each of the signal non-data symbols disposed among the signal data symbols. Each received signal is related to the other signals of the plurality of signals as different superpositions or summations of different reflections of an original signal. The method also includes separating the signal non-data symbols from the signal data symbols, and comparing the signal non-data symbols to a set of known non-data symbols. The method further includes determining a set of weights according to the comparison of the signal non-data symbols to the set of known non-data symbols, the weights to be combined with the signal data values to limit the effect of interference on the signal data symbols. An adaptive antenna array is also provided including a weight calculator including a program which controls the weight calculator to perform the comparing and determining steps of the method.

Figure 1:
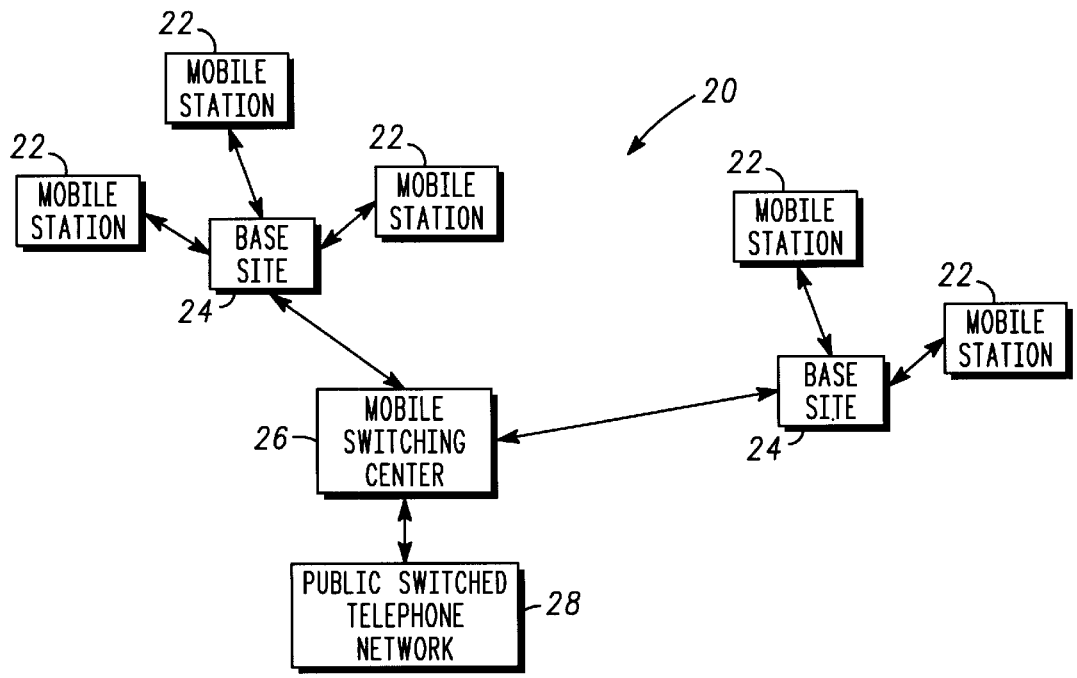
FIG. 1 is a schematic diagram of a communication system using adaptive antenna arrays and a method for control thereof according to embodiments of the present invention.

FIG. 1 shows a communication network or system 20, and in particular a mobile or wireless radio frequency communication system. Although the system 20 shown is a mobile or wireless radio frequency communication system, the system 20 could be any type of communication system, for example a wired or wireline system or a system using a method of communication other than radio frequency communication.

The system 20 includes a plurality of mobile communication devices (such as mobile stations) 22 and a plurality of fixed communication devices (such as base sites) 24. The mobile stations 22 and the base sites 24 communicate using radio-frequency signals. The base sites 24 are coupled to a mobile switching center 26 over a wired or wireline connection, the mobile switching center 26 in turn being coupled over a wired or wireline connection to the public switched telephone network 28.

While a limited number of mobile stations 22, base sites 24, and mobile switching stations 26 are shown in FIG. 1 for ease of illustration, it will be recognized that the system 20 may, and typically does, include numerous mobile stations 22 communicating with numerous base sites 24, the base sites 24 in turn being in communication with numerous mobile switching stations 26. The invention described herein is not limited by the size of the system 20 shown.

Figure 2:
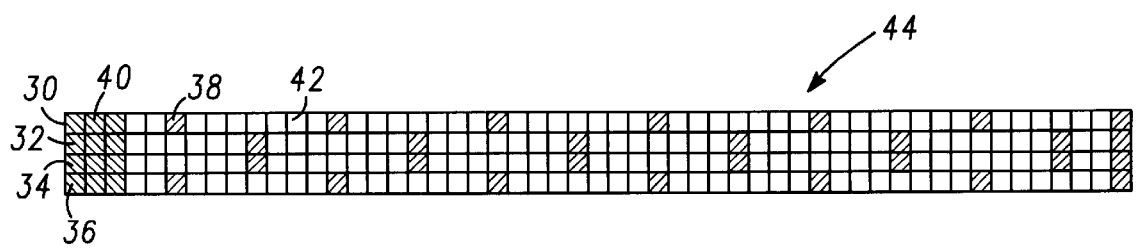
FIG. 2 is a schematic diagram in time-frequency (symbol-subchannel) space of a message slot encoded for a pilot symbol-assisted multicarrier communication system.

The mobile stations 22 and base sites 24 preferably encode transmitted signals according to the format used with radio communication systems sold under the trademark integrated Digital Enhanced Network® (iDEN®) by Motorola, Inc., although the method and apparatus according to the present invention are applicable to other communication systems as well, such as for example, orthogonal frequency division multiplex (OFDM) systems or the Global System for Mobil Communications (GSM). As shown in FIG. 2, an iDEN®-formatted signal (with the training symbols used for calibration of the power amplifier and a guard interval used to prevent overlap of time adjacent transmissions not shown) is partitioned into a plurality of (in this case four) different signals 30, 32, 34, 36 that are transmitted in four subchannels in frequency division multiplex fashion. Each of the four subchannels has a signaling rate of 4 ksym/sec and a spacing of 4.5 kHz. The total signal bandwidth is about 18 kHz, which is suitable for transmission via the typical 25 kHz land-mobile channel.

Each of the signals 30, 32, 34, 36 includes non-data symbols (pilot symbols 38 and pilot/synchronization symbols 40) and data symbols 42. Each of the non-data symbols 38,40 are disposed among the data symbols 42 at a plurality of predesignated locations/times that are known to the receiver and therefore retrievable by the receiver. After being retrieved, the pilot symbols 38,40 are compared to a set of previously known pilot symbols to allow for measurement of and correction for the effects of the transmission environment on the data symbols 42 as will be explained in greater detail below. The synchronization symbols 40 are used by the receiving antenna to allow for signal synchronization so that the symbols 38, 40, 42 may be properly sampled. The data symbols 42 in each transmission unit constitute the information to be communicated via the transmission.

The pilot, synchronization and data symbols 38, 40, 42 are transmitted in a symbol transmission unit referred to as a slot 44, one of which is shown in FIG. 2. Each slot 44 is 15 ms long (including the PA training symbols and guard interval omitted in FIG. 2), and includes 172 data symbols 42 and 40 pilot and pilot/synchronization symbols 38, 40. The iDEN® system is designed to support multiple data symbol formats including, for example, QPSK, 16QAM and 64QAM.

Figure 3:
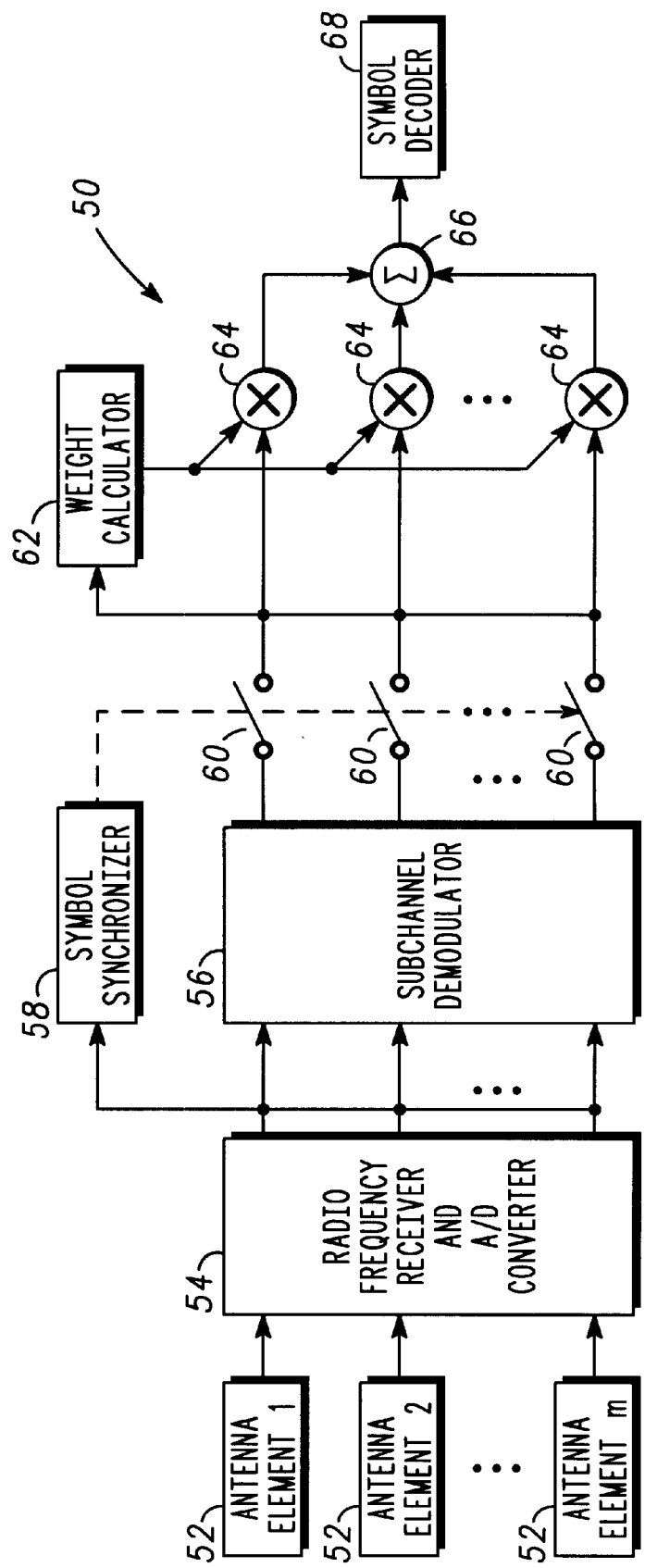
FIG. 3 is a block diagram of an adaptive antenna array according to an embodiment of the present invention.

At least one, and preferably all, of the base sites 24 and possibly one or more of the mobile stations 22 are equipped with adaptive antenna arrays according to an embodiment of the present invention. FIG. 3 shows an adaptive array antenna 50 for receiving and processing a wireless transmission signal.

The array 50 includes m antenna elements 52, each of which is coupled to a separate train of signal processing equipment, although much of the equipment has been represented as a single block. Each train of signal processing equipment includes a radio frequency receiver and analog-to-digital converter 54. Although, the receiver and converter has been shown as a single device 54, the receiver may be separate from the converter physically as well as operationally. The output of the receiver/converter 54 is supplied to both a subchannel demodulator 56 and a symbol synchronizer 58.

The symbol synchronizer 58 controls a plurality of sampling devices 60 to sample the output of the subchannel demodulator 56 at a rate that is determined according to a conventional symbol rate sampling algorithm. The sampled signals are thereafter coupled to both a weight calculator 62 and to multipliers 64. The weight calculator 62 determines weights according to an algorithm according to the present invention, the weights being combined with the output of the sampling devices 60 by the multipliers 64. The output of the multipliers 64 is coupled to a summing device or summer 66 which combines the weighted signals from each of the signal processing trains. The output of the summer 66 is coupled to a symbol decoder 68 that further processes the signal by, for example, decoding the transmitted data symbols and converting the decoded data symbols into a speech signal.

Figure 4:
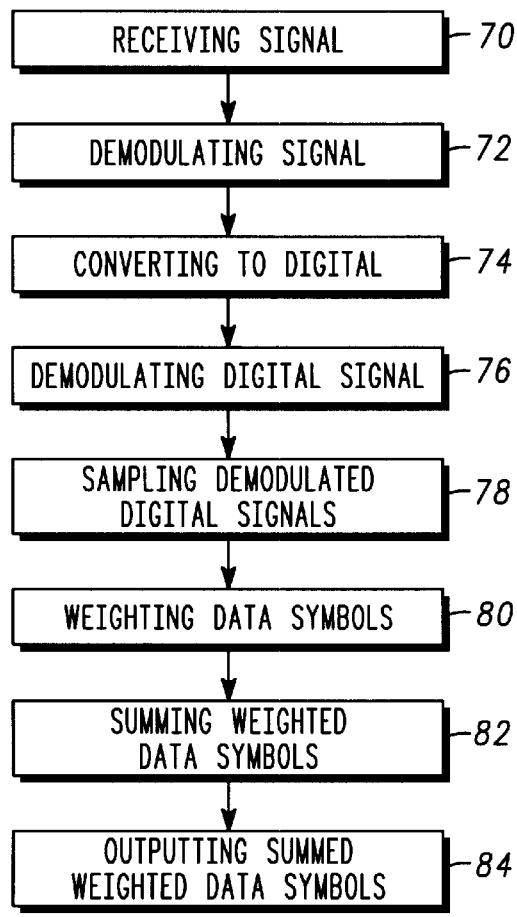
FIG. 4 is a flow chart illustrating the operation of the adaptive antenna array of FIG. 3.

Referring now to FIG. 4, the method of operation of the adaptive antenna array 50 shown in FIG. 3 is now discussed. The method begins at a step 70, where a plurality of signals are received by the antenna elements 52 of the array 50. It will be recognized that each of the signals received by the array elements 52, for example, by one of the base sites 24, constitutes a distinct and different superposition or summation of different reflections of an original signal transmitted by, for example, one of the mobile stations 22. As explained previously, the distinct and different reflections of the original signal are caused by reflective surfaces interposed between the transmitting mobile station 22 and the receiving base site 24. Of course the received signal may also contain a direct "line of sight" component that is not reflected off of any scatterers so that the received signal at each array element 52 may include an original signal, a summation of a plurality of reflections of the original signal, or a summation of the original signal and the plurality of reflections of the original signal. The signal received by each antenna element 52 also contains contributions from interfering mobile stations 22 or base sites 24 as well as noise. In the following, the signal from the mobile station 22 or base site 24 that the antenna array 50 is attempting to receive will be referred to as a "desired signal" and the signals from other mobile stations 22 and base sites 24 will be referred to as "interference signals". After reception of the plurality of signals by each of the antenna elements 52, the signals are then processed by the train of signal processing equipment associated with each element 52 according to the following method.

At a step 72, each of the signals is demodulated by the radio frequency receiver 54 from a radio frequency to a baseband signal. Each of the demodulated signals is converted at a step 74 from an analog signal to a digital signal by the analog-to-digital converter 54. At a step 76, each signal is then demodulated or separated by the subchannel demodulator 56 into the subchannel signals, shown as 30, 32, 34, 26 in FIG. 2.

At the same time, the digital signals produced by the receiver/converter 54 are also analyzed by the symbol synchronizer 58. That is, the symbol synchronizer 58 uses conventional synchronizing algorithms (such as, for example, the algorithms disclosed in U.S. Pat. No. 5,343, 499, which is hereby incorporated herein in its entirety) to detect the presence of the synchronizing symbols 40 and to determine from these symbols 40 the proper sampling timing for the sampling devices 60 and the times at which each of the pilot and data symbols 38, 40, 42 in a given slot 44 will arrive. Given this timing information, it is possible to separate the pilot symbols 38, 40 from the data symbols 42.

Consequently, after being demodulated by the demodulator 56 at the step 76, the signals are sampled at a step 78 by the sampling devices 60 which are controlled by the symbol synchronizer 58 to separate the pilot symbols 38,40 from the data symbols 42. The data symbols 42 are supplied to the multipliers 64, while the pilot symbols 38, 40 are supplied to the weight calculator 62. The weight calculator 62 determines, based on the pilot symbols 38, 40 received and a set of reference pilot symbols known to the receiver, weights to be supplied to the multipliers 64 to be combined with the data symbols 42 to limit the effects of interference and noise. The data symbols 42 and the weights are combined by the multipliers 64 to "weight" the data symbols 42 at a step 80.

The resulting weighted data symbols are summed at a step 82 by the summing device 66 to form a compensated signal, z(k), where k is the data symbol index. The compensated signal z(k) is outputted at a step 84 to the symbol decoder 68 for further processing.

Figure 5:
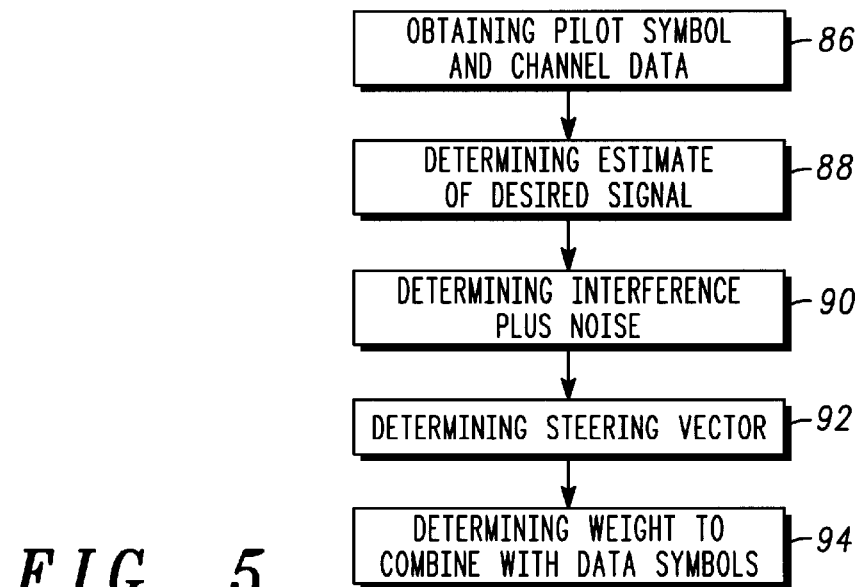
FIG. 5 is a flow chart illustrating an embodiment of a weight determination method used in the method of operation of FIG. 4.

FIG. 5 illustrates an embodiment of a method according to the present invention for determining a weight vector w that may be combined with the data symbols 42, such as in the step 80 of the method illustrated in FIG. 4, to limit the effects of interference and noise on the data symbols 42. The weight vector w is determined by the following equation (1):

$$w = \alpha K_{i+n}^{-1} b^*$$

where $\alpha$ is a scalar quantity important for symbol decision thresholding, $K_{i+n}$ is the estimated interference-plus-noise spatial covariance matrix and $b^*$ is the complex conjugate of the estimated array response or "steering vector" for the desired signal. Equation (1) may be viewed as either maximizing the output signal-to-noise-plus interference ratio or, equivalently, minimizing the mean-square error (or MMSE).

The method begins at a step 86 where information concerning the pilot symbols and expected channel conditions is obtained by the weight calculator 62. Specifically, the calculator 62 obtains information about the pilot symbol samples, the known (i.e. predetermined or previously supplied) pilot symbols, and the worst-case Doppler and delay spreads. That is, the pilot symbol samples may preferably be represented in matrix form as the d×m matrix V, V being equal to $[v_1, v_2, \ldots v_i \ldots v_m]$, where $v_i$ is the d×1 vector of the pilot samples received by the ith antenna element and obtained by sampling the output of the subchannel demodulator 56. The known pilot symbols may likewise preferably be represented in vector form as a d×1 vector p, p being equal to $[p_1, p_2, \ldots p_d]^T$. The worst-case Doppler and delay spreads, denoted $\tau$ and $\nu$ respectively, are known quantities that have been incorporated into the design of the adaptive antenna array 50 prior to operation of the array 50. For example, the Doppler spread $\nu$ is approximately equal to 1.5 $fv$, where $f$ is the carrier frequency in GHz and $v$ is the vehicle speed in miles per hour. Delay spreads depend on the environment, but are typically less than 5 microseconds in land-mobile and cellular systems.

After obtaining this information, the weight calculator 62 forms at a step 88 an estimate for the pilot symbol values 38, 40 based on expected worst-case signal fading behavior as determined by the worst case Doppler and delay spreads. In particular, the pilot symbol sample column vector $v_i$ (where $v_i$ is the column vector equal to $[v_1 v_2, \ldots v_d]^T$) may be modeled for the ith element (or branch) of the adaptive antenna array 50 according to the following equation (2):

$$v_i = Ph_i + n_i$$

where P is an d×d diagonal matrix of known pilot symbols (i.e., =diag(p)), $h_i$ is a d×1 vector of signal fading (propagation) gains, and $n_i$ is an d×1 vector of interference and noise factors (i+n). Alternatively expressed, $Ph_i$ represents the portion of the received pilot symbol sample values that was transmitted by a communication device that the receiver is attempting to receive transmissions from after fading. $n_i$ represents the portion of the pilot symbol sample values contributed by interference from other communication devices and noise factors.

In determining the $Ph_i$ portion of the received pilot symbol sample values, $h_i$ may be derived using a linear MMSE estimate of the desired signal fading gains. According to linear MMSE theory:

$$h_i = Cg_i$$

where C is an estimator matrix and $g_i$ is a vector of raw estimated channel gains (i.e, $g_i = P^{-1}v_i = P^{-1}(Ph_i + n_i) = h_i + P^{-1}n_i$ and $g = h + P^{-1}n = [g_1, g_2, \ldots, g_d]$). The elements of $g_i$ are referred to as "raw" estimated channel gains because no attempt has been made to reduce the portion of $g_i$ due to interference from other communication devices and noise.

The C matrix, in turn, is given by equation (3):

$$C = R_{hg} R_{gg}^{-1}$$

where $R_{hg}$ is the cross-correlation matrix between h and g, and $R_{gg}$ is the correlation matrix of g. $R_{hg}$ may be derived as follows:

$$R_{hg} = E\{hg^H\} = E\{h(h+P^{-1}n)^H\} = E\{hh^H\} + E\{h(P^{-1}n)^H\}$$

where the superscript H denotes a Hermetian transpose (i.e. the complex conjugate transpose), $E\{X\}$ denotes the statistical expectation operation (i.e. the statistical average), and the antenna element subscript i has been dropped from the signal fading gain vector $h_i$ since $R_{hg}$ is not dependant on the antenna element because of the expectation operation. However, because fading gains and noise are uncorrelated, the $E\{h(P^{-1}n)^H\}$ equals zero, leaving $E\{hh^H\}$ or $R_{hh}$. $R_{hh}$ is the covariance matrix of the channel fading (propagation) gains, and may also be written as $\gamma R_{hh}$ where $\gamma$ is the average channel power gain over the interval of the interest (e.g. the interval of time over which the channel weight vector is being calculated) and $R_{hh}$ is the now the normalized correlation matrix of the expected channel gain. $R_{gg}$ may be derived as follows:

$$R_{gg} = E\{gg^H\} = E\{(h+P^{-1}n)(h+P^{-1}n)^H\},$$

or $$R_{gg} = E\{hh^H\} + E\{h(P^{-1}n)^H\} + E\{P^{-1}nh^H\} + E\{P^{-1}n(P^{-1}n)^H\}$$

From the preceding derivation for $R_{hg}$, it is recognized that the first term, $E\{hh^H\}$, is equal to $\gamma R_{hh}$. The second and third terms, ($E\{h(P^{-1}n)^H\}$ and $E\{P^{-1}nh^H\}$), equal zero because fading and noise are uncorrelated. As for the fourth term, it can be shown to be equal to $P^{-1}R_{nn}P^{-1H}$.

Making the appropriate substitutions for $R_{hg}$ and $R_{gg}$, noting that $P^{-1H}$ is equal to $P^{*-1}$, the linear MMSE estimate of $h_i$ is equation (4):

$$h_i = \gamma R_{hh}(\gamma R_{hh} + P^{-1}R_{nn}P^{*-1})^{-1}P^{-1}v_i$$

where $\gamma$, as noted above, is the average channel power gain over the interval of interest, and $R_{hh}$ and $R_{nn}$ are autocorrelation matrices, having dimensions of d×d, of the channel fading and interference plus noise, respectively.

The autocorrelation matrix of the fading gains, $R_{hh}$, is a time-frequency (as opposed to spatial) autocorrelation matrix such that the fading function is compared to a version of itself shifted in time and frequency, i.e., it is a function of pilot symbol separation in both the symbol (time) and subchannel (frequency) domains. To obtain the autocorrelation matrix for $R_{hh}$, the expected fading statistics, i.e., the maximum one-sided delay and Doppler frequency, $\tau$ and $\nu$, for the channel are used. Specifically, assuming that the expected delay and Doppler profiles are uniform, the i,jth element of $R_{hh}$ is found using a two-dimensional Fourier transform method as follows:

$$R_h(i,j)=\text{sin } c[2\pi\tau\Delta_F(i,j)]\cdot\text{sin } c[2\pi\nu\Delta_T(i,j)]$$

where $\pi$ represents the maximum one-sided delay, $\nu$ represents the maximum one-sided Doppler frequency, $\Delta_T(i,j)$ and $\Delta_F(i,j)$ are, respectively, the time and frequency differences between the ith and the jth pilot symbols and sinc[X] is the function defined as sin(X)/X.

To obtain the autocorrelation matrix for interference and noise, $R_{nn}$, it is assumed that the interference plus noise component of the pilot symbol samples is stationary and white, such that:

$$R_{nn}=\sigma^2\cdot I$$

where $\sigma^2$ is the per-element average power of interference and noise, and I is the identity matrix. Although the assumption that the interference and noise portion of the pilot symbol samples is stationary and white is not strictly true in the case of interference, it is a reasonable assumption given that it is assumed that no knowledge regarding the nature of the interfering signals is available.

Making the further assumption that the known pilot symbols have equal magnitudes, i.e., $|p_i|=p$, $h_i$ can be simplified to equation (5):

$$h_i=R_{hh}(R_{hh}+\rho^{-1}I)^{-1}P^{-1}v_i$$

where $\rho$ is the per-element average pilot to interference plus noise ratio, $\gamma p^2/\sigma^2$. Note that, as defined, $\rho$ may not be equal to the signal to interference plus noise ratio experienced by the signals received at each antenna element, since the pilot and data symbols may not have equal power.

$Ph_i$ thus represents the estimated desired signal portion of the received signal at the pilot symbol instants. At a step 90, the interference and noise components of the pilot symbol sample values and $K_{i+n}$, the interference-plus-noise spatial covariance matrix, are calculated using $Ph_i$ in the following manner. It will be recognized that according to equation (2) the difference between the estimated desired signal portion of the pilot symbol sample values, $Ph_i$, and the pilot symbol sample values, $v_i$, is the portion of the pilot symbol sample values caused by interference and noise, i.e.:

$$n_i=v_i-Ph_i$$

Substituting equation (5) into this version of equation (2), $n_i$ may be rewritten as follows:

$$n_i=\sigma^2 P^{*-1}(R_{hh}+\rho^{-1}I)^{-1}P^{-1}v_i$$

The per-element interference and noise estimates, $n_i$, may be concatenated to obtain a d×m matrix, $N=[n_1, n_2, \ldots n_m]$ to form equation (6):

$$N=\sigma^2 P^{*-1}(R_{hh}+\rho^{-1}I)^{-1}P^{-1}V$$

Using the matrix N, the interference-plus-noise spatial covariance matrix, $K_{i+n}$, from equation (1) may be estimated using a conventional sample covariance matrix approach by forming:

$$K_{i+n}=N^H N$$

Further, by defining a d×m matrix G to represent the "raw" estimated channel gains obtained by dividing the known pilot symbols into the pilot symbol samples, i.e., $G=P^{-1}V$, and by defining a variable $R=R_{hh}+\rho^{-1}I$, $K_{i+n}$ may be reduced to:

$$K_{i+n}=G^H R^{-2} G$$

The scalar terms associated with $K_{i+n}$ are not shown in the preceding equation because the scalar terms cancel each other out when the weight value, w, is calculated. Computer simulations have shown that substituting $R^{-1}$ for $R^{-2}$ in the above expression for $K_{i+n}$ can result in better suppression of the effects of interference and noise in the compensated signal.

As a further refinement to $K_{i+n}$, instead of equally weighting all of the interference and noise estimates across all pilot instants, a diagonal weighting matrix A is used to weigh the contribution of pilots that are located farther away from the data symbol of interest less heavily. Specifically, the weighting matrix A is used to calculate $K_{i+n}$ according to:

$$K_{i+n}=N^H A N$$

In one embodiment of the present invention, the weighting matrix A is the identity matrix so that no weighting is done while in other embodiments of the present invention weighting of the various pilots is performed. Additionally, as mentioned above the $R^{-2}$ term may be replaced with an $R^{-1}$ term to yield equation (7):

$$K_{i+n}=G^H R^{-\frac{1}{2}} A R^{-\frac{1}{2}} G$$

With the $K_{i+n}$, term determined, the array response or "steering" vector b (dimensions m×1) is estimated at a step 92 (although the order of steps 88, 90 and 92 is not important). That is, for each antenna element i, the scalar channel gain $b_i$ at the data symbol instant (k) is a function of the pilot samples $v_i$ according to equation (8):

$$b_i=Z_k g_i$$

where $Z_k$ is an estimator matrix and $g_i$ is the vector of raw estimated channel gains for the ith antenna. The $Z_k$ matrix in this case is actually a 1×d vector, the transpose of which will be known as the set of pilot interpolation coefficients, $c_k$ (where $Z_k=c_k^T$).

The $Z_k$ matrix (or vector), in turn, is given by equation:

$$Z_k=R_{bg}R_{gg}^{-1}$$

where $R_{bg}$ is the cross-correlation matrix (actually a 1×d vector in this case) between $b_i$ and g, and $R_{gg}$ is the correlation matrix of g. $R_{bg}$ may be derived as follows:

$$R_{bg}=E\{b_i g^H\}=E\{b_i(h+P^{-1}n)^H\}=E\{b_i h^H\}+E\{b_i(P^{-1}n)^H\}$$

However, because the steering vector and noise are uncorrelated, the $E\{h(P^{-1}n)^H\}$ equals zero, leaving $E\{bh^H\}$ or $R_{bh}$. $R_{bh}$ is the cross-correlation matrix (actually a 1×d vector in this case) of the expected channel fading (propagation) gain at the data symbol instant and the vector of channel fading at the pilot instants. $R_{bh}$ may also be written as $\gamma r_{bh}^T$ where $\gamma$ is the average channel power gain over the interval of the interest (e.g. one slot) and $r_{bh}$ is the normalized cross-correlation vector of channel fading between the data symbol instant, k, and the pilot symbol instants. $R_{gg}$ may be derived as above to form:

$$\gamma R_{hh'} + P^{-1} R_{nn} P^{*-1}.$$

Making the appropriate substitutions for $R_{bg}$ and $R_{gg}$, the MMSE estimate of $b_i$ is equation (9):

$$b_i = \gamma r_{bh}^T (\gamma R_{hh} + P^{-1} R_{nn} P^{*-1})^{-1} P^{-1} v_i$$

In the foregoing as well as the sequel, it should be understood that the pilot interpolation coefficients $c_k$ and the set of pilot symbol samples used are functions of k, the data symbol index.

To obtain the cross-correlation vector of the channel fading, $r_{bh}$, the expected worst case one-sided delay and Doppler frequency, $\tau$ and $v$, are used and, as before, the delay and Doppler profiles are assumed to be uniform such that the ith element of $r_{bh}$ is found using a two-dimensional Fourier transform method as follows:

$$r_{bh}(i,j) = \text{sin } c[2\pi\tau\Delta_F(i,j)] \cdot \text{sin } c[2\pi v \Delta_T(i,j)]$$

where $\tau$ represents the maximum one-sided delay, $v$ represents the maximum Doppler frequency, and $\Delta_T(i,j)$ and $\Delta_F(i,j)$ are, respectively, the time and frequency differences between the ith and the jth pilot symbols.

As described above, it is assumed that the interference plus noise, i+n, component of the pilot symbol samples is stationary and white, such that:

$$R_{nn} = \sigma^2 \cdot I$$

where $\sigma^2$ is the per-element average power of the interference and noise, and I is the identity matrix. It is further assumed that the received pilot symbols have equal magnitudes, i.e., $|p_i|=p$, such that $b_i$ can be simplified to equation (10):

$$b_i = r_{bh}^T (R_{hh} + \rho^{-1} I)^{-1} P^{-1} v_i = r_{bh}^T R^{-1} P^{-1} v_i$$

where, as described above, $\rho$ is the per-element average pilot to interference plus noise ratio $\gamma p^2 / \sigma^2$. The per element channel gain estimates, are concatenated to form an m×1 vector $b = [b_1, b_2, \ldots b_m]^T$ and G, i.e., $G = P^{-1}V$ and R, i.e., $R = R_{hh} + \rho^{-1} I$, are substituted into equation (10) to obtain a simplified equation (11) for b as follows:

$$b = G^T R^{-1} r_{bh}$$

where $R^{-1} r_{bh}$ represents a set of n pilot interpolation coefficients (or c) for the data symbol of interest.

Having found expressions for $K_{i+n}$ and b, the weights are calculated at step 94. In particular, substituting equations (7) and (11) into equation (1) gives equation (12):

$$w = \alpha (G^H R^{-1/2} A R^{-1/2} G)^{-1} G^H R^{-1} r_{bh}$$

which is the complete weight solution, at least to within a constant and the constant generally washes out in the analysis. $\alpha$ is useful, however, for multilevel (e.g., 16QAM, 64QAM etc.) symbol detection as well as for deriving channel state information for forward error correction decoding, and can be shown to be in the general case (13):

$$\alpha = (b^T K_{i+n}^{-1} b^*)^{-1}$$

Using substitution with the values determined above, $\alpha$ can be determined according to the equation (14):

$$\alpha = (r_{bh}^T R^{-1} G (G^H R^{-1/2} A R^{-1/2} G)^{-1} G^H R^{-1} r_{bh})^{-1}$$

Figure 6A:
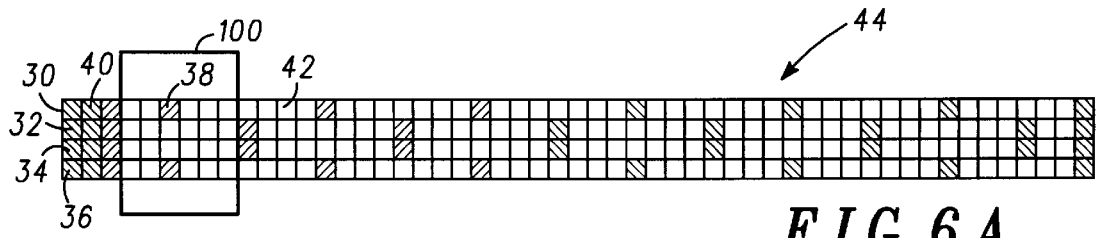
FIGS. 6A–F are schematic diagrams of a message slot encoded for a pilot symbol assisted multicarrier communication system as it is processed according to an embodiment of a weight determination method of the present invention.
Figure 6B:
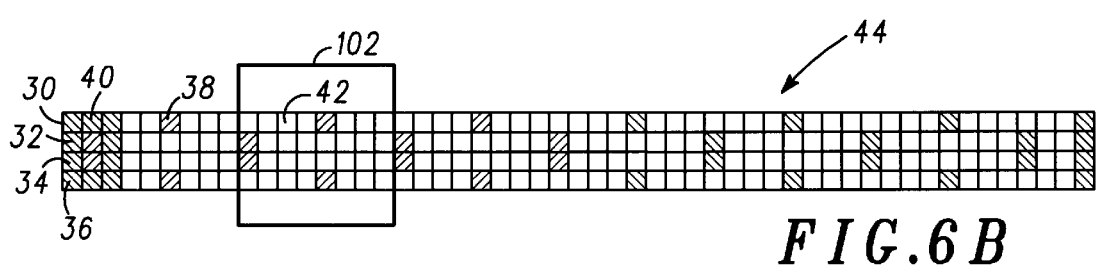
Figure 6C:
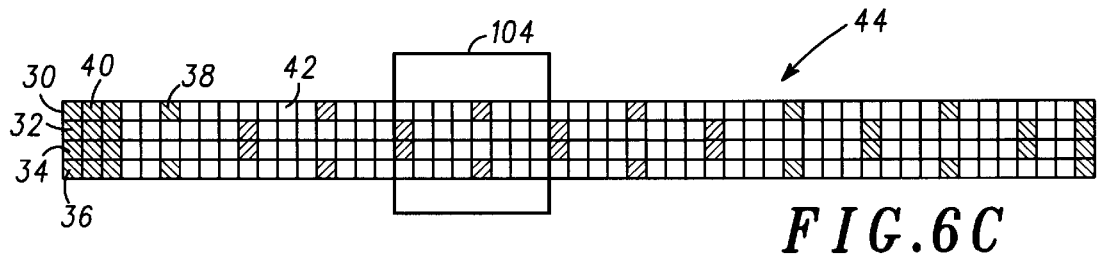
Figure 6D:
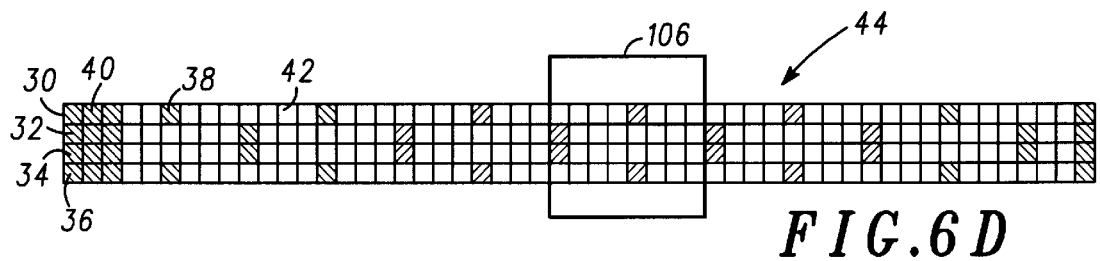
Figure 6E:
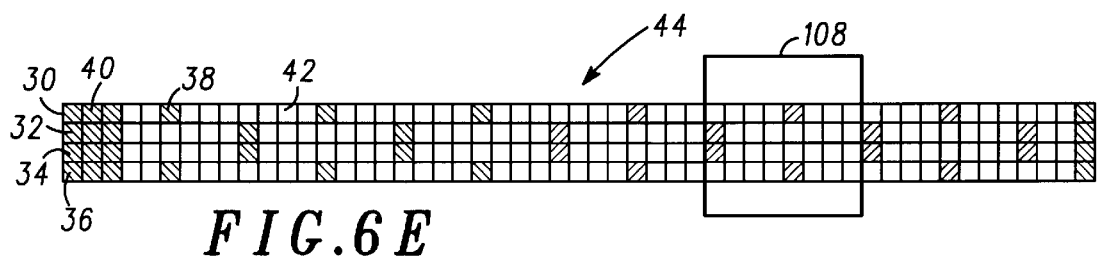
Figure 6F:
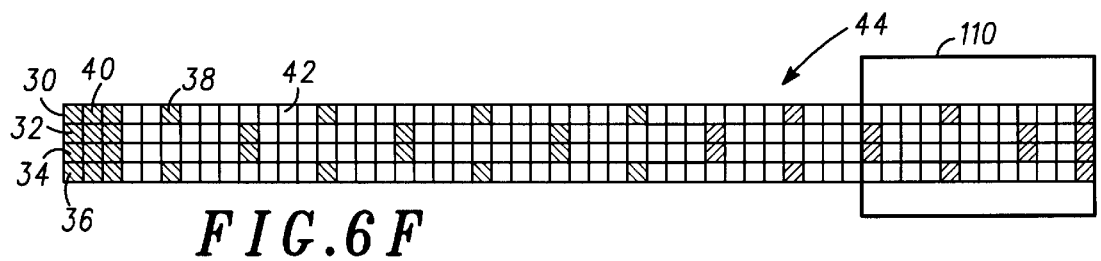

According to an embodiment of the present invention, while the steering vector b is calculated for each data symbol 42, the interference-to-noise spatial covariance matrix is preferably calculated less frequently to save computations (although the calculation could be performed for each data symbol if desired). For example, the data symbols 42 in the slot 44 may be divided into six separate units or blocks 100, 102, 104, 106, 108, 110 and a separate interference-to-noise spatial covariance matrix may be calculated for each of the blocks 100, 102, 104, 106, 108, 110. For example, as shown in FIG. 6A, the block 100 may encompass a first group or set of fourteen pilot symbols 38, 40 (indicated in black) and a first group or set of twenty-two data symbols 42 (bounded with a rectangular border). As shown in FIGS. 6B–D, the blocks 102, 104, 106, 108 encompass additional groups of fourteen pilot symbols 38, 40 and twenty-six data symbols 42. The last block 110 encompasses a final group of fourteen pilot symbols 38 and the remaining data symbols 42. It will be recognized that the division of the slot 44 into blocks may be different from that shown in FIGS. 6A–F, but remain with the scope of the present invention.

Referring to equations (1), (11), and (13), it will be recognized that portions of the equations may be precomputed and stored in memory by the weight calculator 62. For example, c, also known as the vector of pilot interpolation coefficients may be precalculated and stored in memory. A value $Q_l$, which is the Cholesky triangle of the expression $R_l^{-1/2} A_l R_l^{-1/2}$ (i.e., $Q_l Q_l^H = R_l^{-1/2} A_l R_l^{-1/2}$), may also be stored in memory. In this notation, variables with a k subscript are calculated for every symbol, and variables with a e subscript are calculated on a block-wide basis.

Figure 7:
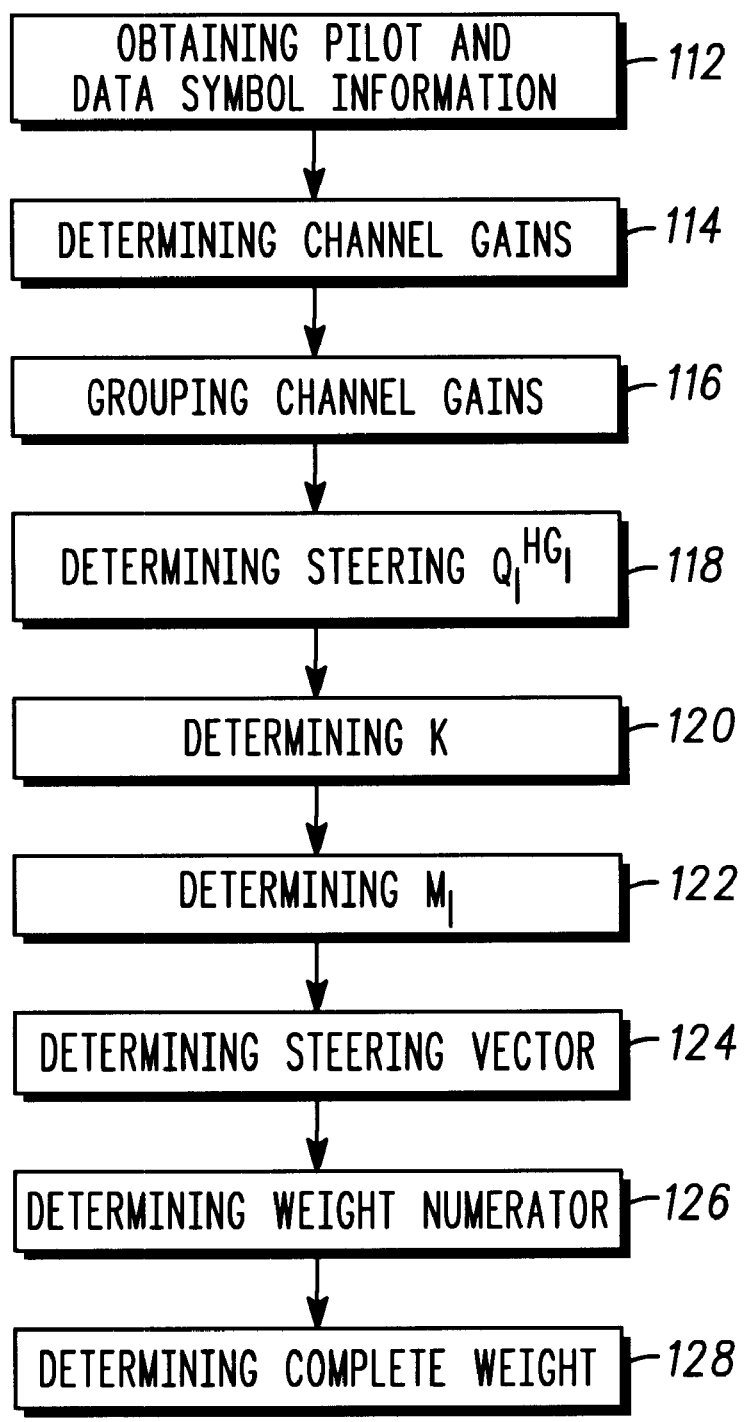
FIG. 7 is a flow chart illustrating the embodiment of the weight determination method shown in FIGS. 6A–F.

Accordingly, as shown in FIG. 7, at a step 112, the pilot and data symbols 38, 40, 42 for a slot 44 are received. Also, the information regarding the known pilot symbols is retrieved. Estimates for the channel gains are computed at a step 114 by dividing the pilot symbol sample values by the corresponding known pilot symbol values, i.e., $g_i = v_i / p_i$.

For each block 100, 102, 104, 106, 108, 110, at a step 116, the relevant estimated channel gains are grouped into a matrix $G_l$. At a step 118, the inner product is formed between the Hermetian transpose of the matrix $Q_l$ (previously calculated and stored in memory) and the matrix $G_l$. At a step 120, $K_l$ is calculated by multiplying the Hermetian transpose of the result of the step 118 by the result of the step 118, i.e., $K_l = (Q_l^H G_l)^H Q_l^H G_l$. At a step 122, a new variable $M_l$ is calculated, $M_l$ being the Cholesky triangle of $K_l$ (i.e., $M_l M_l^H = K_l$)

For each data symbol 42, the precalculated values as well as those calculated in the steps 116, 122 are combined to compute the final weight for that data symbol 42. In particular, at a step 124, the Hermitian transpose of the steering vector corresponding to the kth data symbol, $b_k^*$, is calculated as the inner product of the Hermetian transpose of the gain matrix and the vector of pilot interpolation coefficients, i.e., $G_l^H c_k$. The weight equation, which may be expressed as $(K_l^{-1} b^*_k)/(b^T_k K_l^{-1} b^*_k)$, is then solved in two separate steps 126, 128. In the step 126, the numerator of the weight equation is calculated by solving:

$$K_l w_{k,num} = M_l M_l^H w_{k,num} = b^*_k$$

The step 126 involves solving two triangular systems, avoiding explicit inversion of $K_l$ which results in a computational savings. In the step 128, the weight is calculated by noting that:

$$(K_l^{-1} b^*_k)/(b^T_k K_l^{-1} b^*_k) = w_{k,num}/(b^T_k w_{k,num})$$

such that the final weight is calculated by dividing the result of step 126 by the product of the result of step 126 and the transpose of the steering vector. The weights may then be combined with the data symbols 42 by the multiplier 64, and summed to produce the resultant signal z(k).

It will be recognized that the method illustrated in FIG. 7 may have many variations. For example, the steps 124, 126, 128 may be performed as the respective block values are calculated so that only one $M_l$ need be saved to memory. Moreover, the estimates for $K_l$ and b for a given block may be based on different and distinct sets of pilot symbols 38, 40. Further, the number of pilot symbols used for each K estimate may vary from block to block rather than remaining fixed (for example, at fourteen). Also, the method may be applied to transmission or slot formats that are degenerate cases of the general multicarrier format, for example, a single-carrier format (multiple symbols in the time dimension but only one "subchannel") or a single-baud format (multiple subchannels but with a length of one symbol in the time dimension).

By using the method and apparatus according to the present invention, certain advantages may accrue. For example, the effects of interference and noise on the data symbols may be limited. Moreover, this effect may be limited while taking into consideration fast multipath fading. Further, this effect may be limited without having to tailor the method or apparatus to a specific modulation format.

Other aspects, objects, and advantages of the present invention will be obtained from a study of the specification, drawings and appended claims.

We claim:

1. A method comprising the steps of:
   receiving a plurality of signals, wherein each signal comprises an original signal, a summation of a plurality of reflections of the original signal, or a summation of the original signal and the plurality of reflections of the original signal, each of the plurality of received signals including a series of signal data symbols and signal non-data symbols with the signal non-data symbols disposed among the signal data symbols;
   separating the signal non-data symbols from the signal data symbols;
   comparing the signal non-data symbols to a set of known non-data symbols; and
   determining a set of weights according to the comparison of the signal non-data symbols to the set of known non-data symbols, the weights to be combined with more than one of the plurality of signals to limit the effect of interference on the signal data symbols.

2. The method according to claim 1, wherein each of the signal non-data symbols and the known non-data symbols has a value and the comparison step comprises the steps of:
   determining an estimated value corresponding to each of the signal non-data symbols using the known non-data symbol values; and
   comparing the signal non-data symbol value and the corresponding estimated value for each of the signal non-data symbols.

3. The method according to claim 2, wherein the step of determining an estimated value comprises the step of combining the known non-data symbol values with a set of fading gains which are a function of Doppler and delay spreads of the received signals.

4. The method according to claim 2, wherein the step of determining an estimated value comprises the step of combining the known non-data symbol values with a set of fading gains which are a function of Doppler and delay spreads for the adaptive antenna array.

5. The method according to claim 4, wherein the step of determining an estimated value comprises the step of multiplying the known non-data symbol values by the fading gains.

6. The method according to claim 2, wherein the step of comparing the estimated values comprises the step of determining the differences between each of the signal non-data symbol values and its corresponding estimated value.

7. The method according to claim 6, wherein the step of determining the weights comprises the step of determining an interference-plus-noise covariance matrix according to the differences between each of the signal non-data symbol values and its corresponding estimated value.

8. A method for controlling an adaptive antenna array including a plurality of antenna elements, the method comprising the steps of:
   receiving a plurality of signals, each signal including a series of signal data symbols and signal pilot symbols with the signal pilot symbols disposed among the signal data symbols and each symbol having a value, and wherein each signal comprises an original signal, a summation of a plurality of reflections of the original signal, or a summation of the original signal and the plurality of reflections of the original signal;
   separating the signal pilot symbols from the signal data symbols;
   determining an estimated value corresponding to each of the signal pilot symbols using a set of known pilot symbols with each pilot symbol having a value;
   determining the difference between the signal pilot symbol value and its corresponding estimated value for each of the signal pilot symbols; and
   determining a set of weights according to the differences between each of the signal pilot symbol values and its corresponding estimated value to limit the effect of interference on the signal data symbols.

9. A method for controlling an adaptive antenna array including a plurality of antenna elements, the method comprising the steps of:
   receiving a plurality of signals, each signal including a series of signal data symbols and signal pilot symbols with the signal pilot symbols disposed among the signal data symbols and each symbol having a value, and each signal related to the other signals of the plurality of signals as reflections of an original signal;
   separating the signal pilot symbols from the signal data symbols;
   determining an estimated value corresponding to each of the signal pilot symbols using a set of known pilot symbols with each pilot symbol having a value;
   determining the difference between the signal pilot symbol value and its corresponding estimated value for each of the signal pilot symbols; and
   determining a set of weights according to the differences between each of the signal pilot symbol values and its corresponding estimated value to limit the effect of interference on the signal data symbols.

10. The method according to claim 9, wherein the step of determining an estimated value comprises the step of multiplying the set of known pilot symbol values by a set of fading gains which are a function of Doppler and delay spreads for the adaptive antenna array.

11. The method according to claim 9, wherein the step of determining the weights comprises the step of determining an interference-plus-noise covariance matrix according to the differences between each of the signal pilot symbol values and its corresponding estimated value.

12. The method according to claim 11, wherein the step of determining an interference-plus-noise covariance matrix comprises determining the product of the equation:

$$G^H R^{-1/2} A R^{-1/2} G$$

where G is an estimate of channel gains obtained by dividing the known pilot symbol values into the signal pilot symbol values, R is the sum of the covariance matrix of channel fading gains and an average pilot-to-interference-plus-noise ratio for each antenna element of the adaptive antenna array, and A is a weighting matrix which weighs less heavily contributions of pilot symbols located farther away from a data symbol of interest.

13. The method according to claim 9, wherein:
the signal pilot symbols and signal data symbols comprise a plurality of sets of signal pilot symbols and a plurality of sets of signal data symbols, each set of signal pilot symbols corresponding to one of the plurality of sets of signal data symbols;
the steps of determining an estimated value and determining the difference between each of the signal pilot symbol values and its corresponding estimated value is performed separately for each set of signal pilot symbols; and
the step of determining a set of weights is performed for each signal data symbol in one of the sets of signal data symbols using the difference calculated for the set of pilot symbols to which corresponds to the one of the sets of signal data symbols.

14. A weight calculator for use in a system wherein signals are transmitted between communication devices as a plurality of signals, each signal including a series of signal data symbols and signal non-data symbols divided into symbol transmission units with the signal non-data symbols disposed among the signal data symbols in each unit and wherein each signal comprises an original signal, a summation of a plurality of reflections of the original signal, or a summation of the original signal and the plurality of reflections of the original signal, the weight calculator comprising:

a processor including a program which controls the processor (i) to receive the signal non-data symbols which have been separated from the signal data symbols; (ii) to compare the signal non-data symbols to a set of known non-data symbols; and (iii) to determine a set of weights according to the comparison of the signal non-data symbols to the set of known non-data symbols, the weights to be combined with the signal data values to limit the effect of interference on the signal data symbols.

15. The weight calculator according to claim 14, wherein each of the signal non-data symbols and the known non-data symbols has a value, and the program further controls the processor (i) to determine an estimated value corresponding to each of the signal non-data symbols using the known non-data symbol values, and (ii) to compare the signal non-data symbol value and the corresponding estimated value for each of the signal non-data symbols.

16. The weight calculator according to claim 15, wherein the program further controls the processor to combine the known non-data symbol values with a set of fading gains which are a function of Doppler and delay spreads for the adaptive antenna array to determine an estimated value corresponding to each of the signal non-data symbols using the known non-data symbol values.

17. The weight calculator according to claim 16, wherein the program further controls the processor to multiply the known non-data symbol values by the set of fading gains to determine an estimated value corresponding to each of the signal non-data symbols using the known non-data symbol values.

18. The weight calculator according to claim 15, wherein the program further controls the processor to determine the differences between each of the signal non-data symbol values and its corresponding estimated value to compare the signal non-data symbols to a set of known non-data symbols.

19. The weight calculator according to claim 18, wherein the program further controls the processor to determine an interference-plus-noise covariance matrix according to the differences between each of the signal non-data symbol values and its corresponding estimated value to determine the weights.

* * * * *